June 19, 1962 D. E. WILLIS 3,039,302
FLUID FLOW MEASURING MEANS
Filed Dec. 15, 1958 3 Sheets-Sheet 1

INVENTOR.
DALE E. WILLIS
BY
ATTORNEY

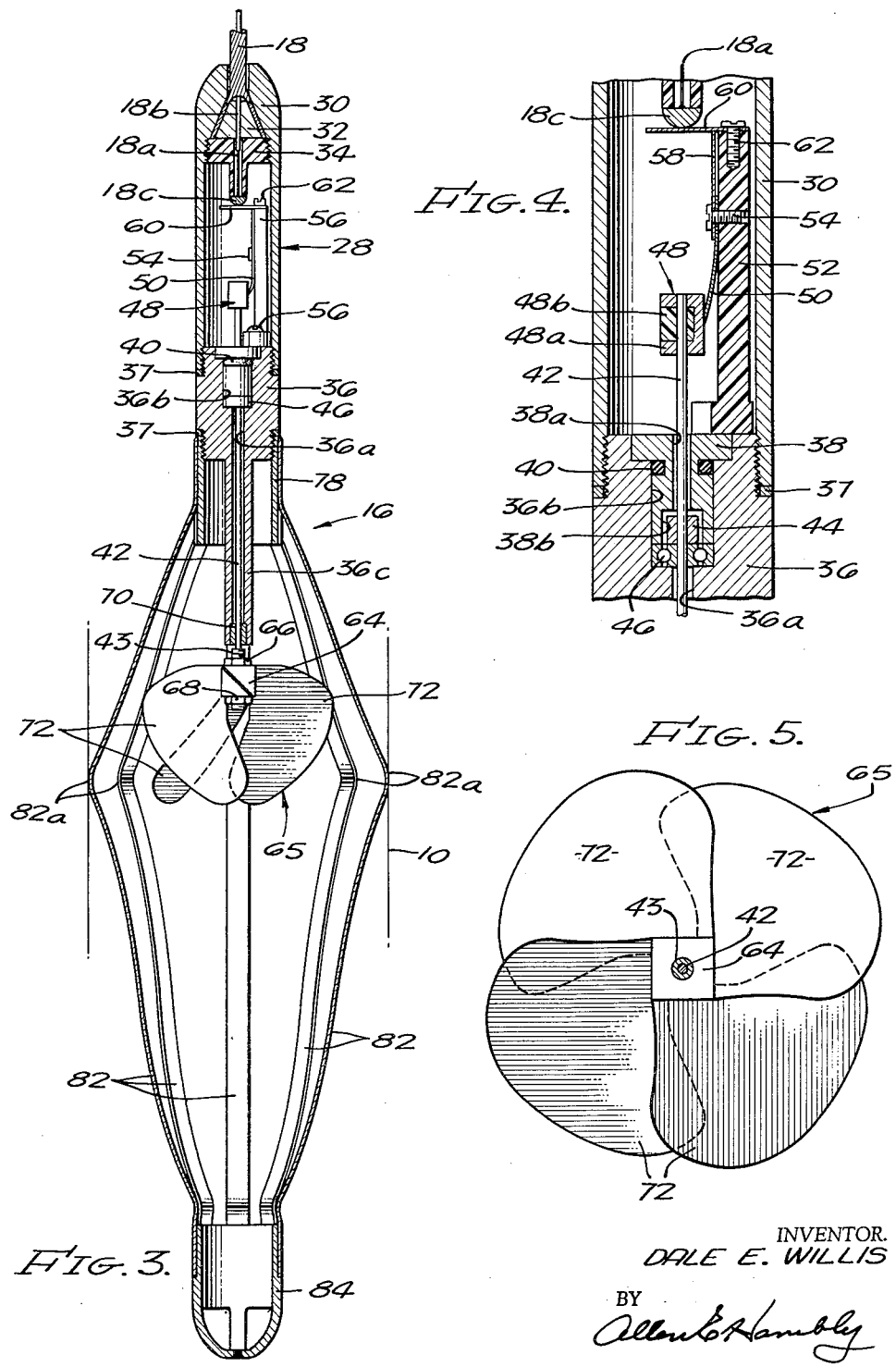

June 19, 1962    D. E. WILLIS    3,039,302
FLUID FLOW MEASURING MEANS
Filed Dec. 15, 1958    3 Sheets-Sheet 3

INVENTOR.
DALE E. WILLIS
BY
Allen E. Hambly
ATTORNEY

United States Patent Office 3,039,302
Patented June 19, 1962

3,039,302
FLUID FLOW MEASURING MEANS
Dale E. Willis, Lakewood, Calif., assignor to BJ Service, Inc., Long Beach, Calif., a corporation of Delaware
Filed Dec. 15, 1958, Ser. No. 780,447
13 Claims. (Cl. 73—155)

This invention relates to apparatus for determining fluid flow, and more particularly to apparatus for determining fluid flow in a passage such as a well bore having limited access.

Although the present invention is susceptible of numerous and varied applications, it is particularly adapted for the determination of fluid flow conditions in well bores which are used for the production or injection of oil, water, gas or the like. More specifically, it is very desirable in the preparation of a well for optimum operating efficiency to know the porosities of the various strata intersected by the well bore and to determine the point of ingress and egress of fluids within the well bore. In determining the porosity of the well bore, fluid is pumped into the well under pressure and the rate at which such fluid flows into the various strata is an indication of the relative porosities of such strata. In a similar manner, if it is desired to determine the rates and points of ingress or egress of fluid in the well bore, it is merely necessary to determine the rate of flow of fluid at various points or positions along the length of the well bore.

In order to make such determinations, it is usual practice to lower a flow meter into the well and by knowing the position of such meter along the length of the well and by noting changes in the rates of fluid flow as the position is changed, an accurate indication is afforded of fluid flow into and out of the well bore. However, the well bore usually has tubing extending into the well and having an inside diameter substantially less than the inside diameter of the well bore proper or the casing which lines such bore. In view of this, prior flow metering devices have necessitated the pulling or removal of such tubing from the well so as to permit insertion of such device into the well bore. In the alternative, such prior flow meters have been so constructed as to pass through the reduced diameter opening through a casing head or through tubing to thereby avoid the requirement of removing the same. However, in the latter instance, such flow meters have not been of the desired efficiency since the mechanism, as for instance an impeller, which is acted upon directly by the fluid flow has not been exposed to all of the fluid flowing at a given transverse section of the bore due to the necessarily reduced size of such mechanism. Also, such devices have not been as accurate as desired due to the fact that they do not remain in the center of the bore but rather are subject to movement transversely of the bore and hence frequently position themselves near the side wall thereof where fluid flow is appreciably affected by frictional forces.

Another object is to provide a flow metering device which can be inserted into a passage through a reduced opening therefor, and which device will be responsive to substantially all of the fluid flowing at a given transverse section of such passage.

In view of the foregoing, it is an object of the present invention to provide a flow metering device which can be contracted for movement through the reduced opening of the passage and expanded when positioned within such passage.

Another object is to provide a flow metering device, as characterized above, comprising an impeller having blades formed of resilient material to permit of contraction or folding of such impeller for traversing the reduced opening of such passage and expansion within the latter for engagement with substantially all of the fluid at a given transverse section thereof.

Another object is to provide a flow meter, as characterized above, having collapsible guide or centralizer means for centering the impeller within the passage while still permitting such meter to be inserted through the reduced opening thereof.

Another object is to employ such collapsible guide means as protection for the collapsible impeller to prevent damage to the latter upon forcible entry thereof into the reduced opening of the passage.

Another object is to provide flow metering apparatus comprising a device, as characterized above, such apparatus including means for determining the rate of rotation of the impeller as an indication of fluid flow.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings, in which:

FIG. 3 is a vertical sectional view of the novel flow meter taken substantially along line 3—3 of FIG. 1;

FIG. 4 is an enlarged sectional view of the switching mechanism positioned within the housing of the flow meter;

FIG. 5 is a horizontal sectional view as taken on the line 5—5 of FIG. 2;

Like reference characters indicate corresponding parts through the several views of the drawings.

Figure 1:
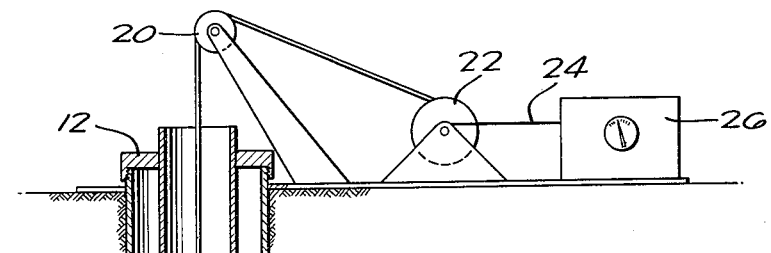
FIG. 1 is an elevational view showing a well bore in section, one embodiment of the novel flow meter of this invention being positioned within the well bore and operatively connected to associated equipment on the surface of the ground.
Figure 2:
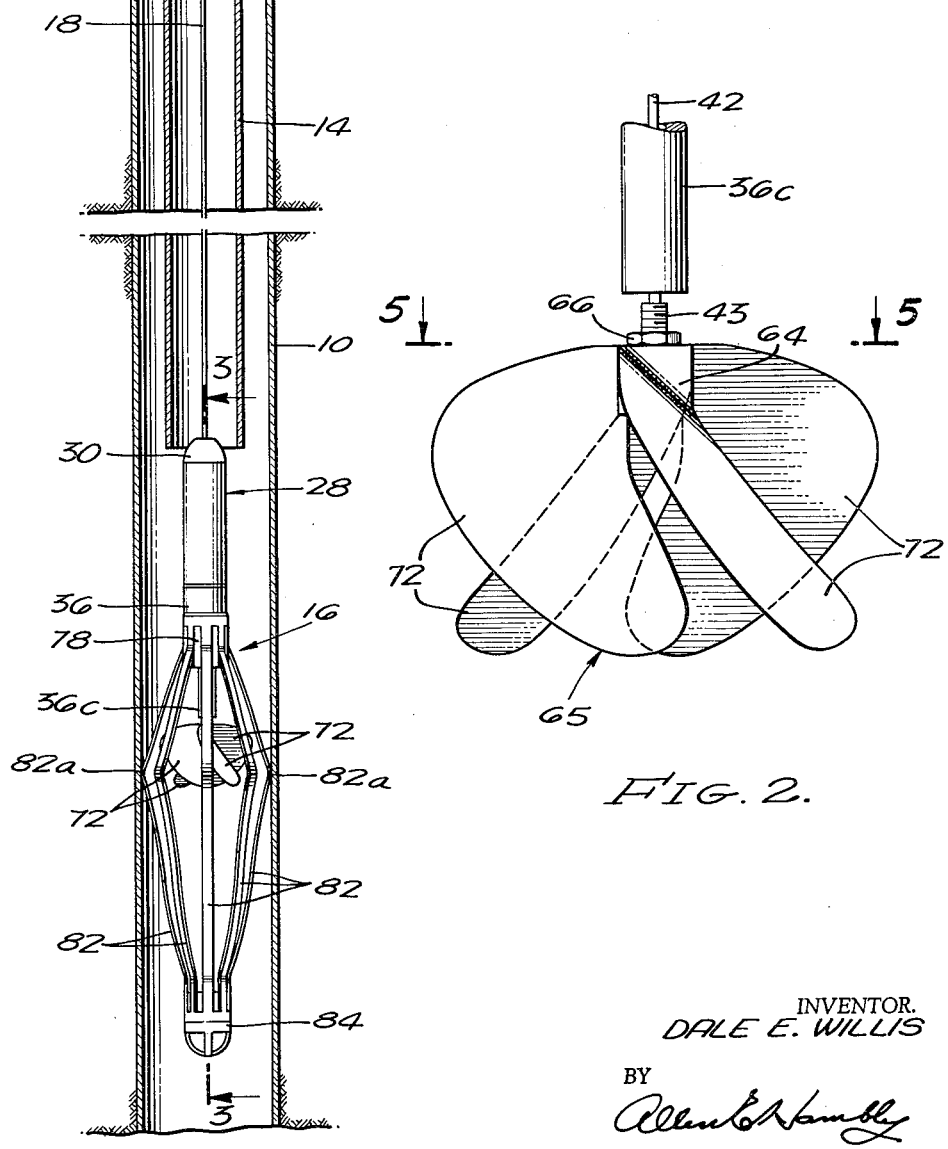
FIG. 2 is an enlarged elevational view of the impeller of the flow meter of FIG. 1.

Referring now to the drawings and to FIG. 1 in particular, there is shown a passage or well bore hole, the purpose of which may be for the production of oil, water, gas or the like, or the well may constitute an injection well through which water or other drive fluid may be injected into the formation to force the flow of oil to a production well displaced therefrom. Within such well bore is a well casing 10 having a head 12 which is fixed to the end of casing 10 extending above the surface of the ground.

Production tubing 14 is positioned within the well bore substantially coaxially of well casing 10 and projecting upwardly through casing head 12.

Suspended within casing 10 below the bottom end of tubing 14 is a flow responsive or metering device 16, there being a conductor cable 18 attached to such device and extending through tubing 14 and over a guide wheel 20 to a drum 22 on which it is wound. As is well known in the art, cable 18 not only provides support means by which device 16 may be raised or lowered within the well bore, but also constitutes an electrical lead which terminates at a slip ring mounted on drum 22. An electrical lead 24 extends from a brush mounted on drum 22 to electrical equipment mounted within housing 26. As will be apparent from FIG. 1, guide wheel 20, drum 22, lead 24 and the electrical equipment within housing 26 are located on the surface of the ground together with all necessary associated equipment, such apparatus including means for indicating the position of flow metering device 16 within the well bore, as is customary.

Referring to FIGS. 3 and 4 of the drawings, flow metering device 16 comprises a housing 28 including a conventional conductor cable coupling member or rope socket 30 provided with a centrally located opening through which cable 18 extends. Said cable 18 comprises an electrical conducting lead 18a surrounded by insulation 18b. The lower end of the outer sheath of the cable 18 is split into a plurality of segments which are spread or flared within cable coupling member 30. A wedge 32 is forced into engagement with the segments of sheath 18b within coupling member 30 by an insulating locking nut 34. Wedge 32 and nut 34 are formed with coaxially disposed openings through which the lower end portion of conducting lead 18a extend and terminates in the form of an electrical contact 18c. Threadably fixed to the lower end portion of coupling member 30 is a bearing housing 36, there being sealing means 37 interposed therebetween to provide a fluid tight seal. Housing 36 is formed with a centrally disposed through opening 36a which is counter bored as at 36b for receiving a bearing retainer 38, there being an O-ring 40 disposed between retainer 38 and housing 36 to provide a fluid tight seal therebetween. A shaft 42 is rotatably positioned within opening 36a of housing 36 and an opening 38a formed in retainer 38. Fixed to shaft 42 within an opening 38b formed in bearing retainer 38 is a thrust bearing member 44. A ballbearing assembly 46 is positioned within counter bore 36b of bearing housing 36 to permit shaft 42 to rotate substantially free of frictional forces.

Fixed to the upper end of shaft 42 within the chamber defined by coupling member 30 and bearing housing 36 is a make and break contact member 48 provided with an electrical conducting segment 48a and an electrical insulating segment 48b arranged such that rotation of contact member 48 causes such conducting and nonconducting segments to alternately contact a spring type contact member 50 which is in contact with the circumferential surface of member 48.

Resilient contact member 50 is mounted on an insulating support member 52 by means of a nut 54 which may be adjusted to vary the resiliency of contact member 50. Support member 52 is fixed to bearing housing 36 by means of screws 56 (only one of which is shown in FIG. 3). Interposed between the head of screw 54 and contact member 50 is a vertical conducting member 58 which is attached to a horizontal conducting member 60. Member 60 is held in engagement with contact member 18c of electrical lead 18a by means of a screw 62 in support member 52.

It should be understood that the structure thus far specifically described is more or less conventional in the flow meter field.

Bearing housing 36 is formed with an extended portion 36c beyond the lower end portion of which shaft 42 extends. Such extended portion of shaft 42 is provided with a threaded sleeve 43 which may be fixed to shaft 42 or formed integrally therewith as desired. Threadably fixed to sleeve 43 is the hub 64 of a fluid flow responsive device or rotatable impeller 65 and a pair of lock nuts 66 and 68 disposed on opposite sides of said impeller hub. A bronze bushing 70 is interposed between shaft 42 and the lower end of the extend portion of bearing housing 36.

Impeller 65 is formed with a plurality of vanes or blades 72 formed of resilient material, as for instance spring steel or brass, said blades being attached to hub 64 to provide a unitary structure. The embodiment chosen for illustration in the drawings of the present invention comprises four individual impeller blades, each of which is disposed at an angle with respect to the axis of rotation of impeller 65 and is of such size as to partially overlap a portion of an adjacent blade as shown at 72a in FIG. 5. It is desirable in the practice of the present invention that the impeller blades be of such size and number as to substantially fill the cross-sectional dimension or area of the passage wherein the device 16 is to operate so that no free opening is afforded therethrough or therearound for the flow of fluid in an axial direction with respect to impeller 65. Rather, the construction of impeller 65 should be such as to insure that substantially all of the fluid flowing at a given cross-section of the passage impinges on the blades so as to create a torque tending to rotate impeller 65. Blades 72 may be formed integrally with hub 64 or they may be attached thereto as by welding, soldering, brazing or clamping as desired. As specifically shown the blades 72 constitute angularly disposed vanes having adjacent portions of adjacent blades axially displaced which facilitates closing or contracting the impeller. It is also contemplated within the scope of this invention that each of the blades 72 may be formed with any desired configuration or shape, as for instance a helical twist to better utilize the force of flowing fluid to create rotational movement of impeller 65. As will be readily realized, such impeller blades may be shaped in any desired manner to make optimum utilization of the fluid flow within the passage or bore hole.

Threadably attached to housing 36 is a cylindrically shaped sleeve or collar 78. A plurality of centralizing springs or guide members 82 each of which has its upper end fixed to collar 78 by means such as welding, silver soldering or brazing, are equally spaced about impeller 65. Each of such guide members 82 is formed of resilient material such as spring steel and extends generally axially of flow metering device 16. The lower end portions of such resilient centralizing springs 82 are attached to an open guide member 84 in any suitable manner. The guide members are pre-formed such that when assembled as above described, they resiliently engage, at points 82a, the inner surface of the passage wherein device 16 is positioned to thereby center impeller 65 within such passage or well bore. It will be understood that at least three such centralizer elements 82 should be employed in equidistantly spaced relation.

Housing 28 of flow metering device 16 is of such size as to freely pass through or traverse tubing 14 which is within the passage or well bore. On the other hand, it is not desirable to have impeller 65 be of such size as to freely pass through tubing 14 since the impeller would then be of such relatively small size with respect to the inner dimension of the passage or well casing that only a fractional portion of the fluid flowing therewithin would create a torque tending to rotate impeller 65.

With the impeller 65 and guide members 82 formed of resilient material as above described, they are readily deformed or contracted for passage through the restrictive opening of tubing 14 while nevertheless being expansible when positioned within the passage so as to permit the centralizing springs to engage the side wall of the passage within casing 10 and the impeller to be engageable by substantially all of the fluid flowing at a given cross-section of such passage as particularly shown in FIG. 5.

Figure 6:
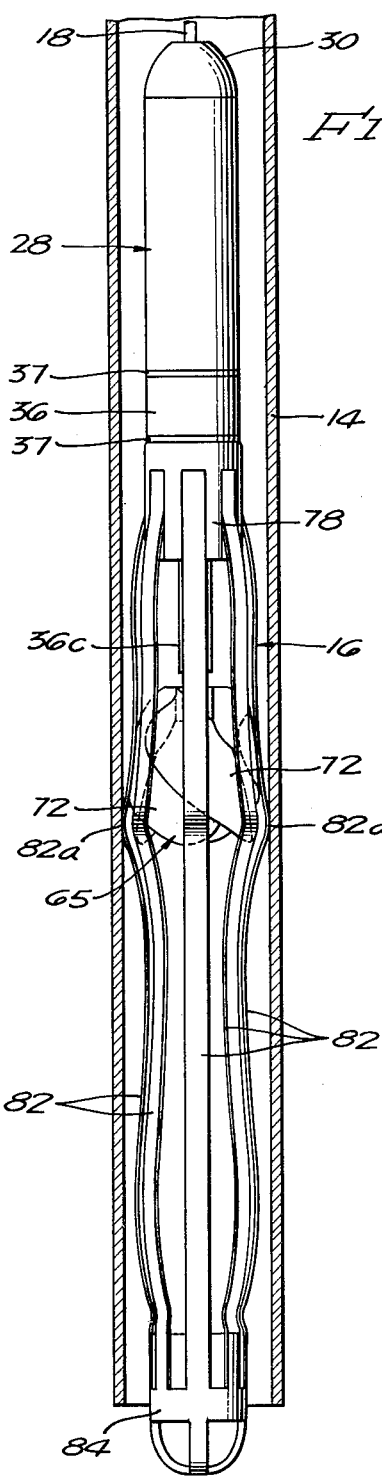
FIG. 6 is a side elevational view of the flow meter positioned within the tubing of the reduced inside diameter which affords the entrance to the well bore.
Figure 7:
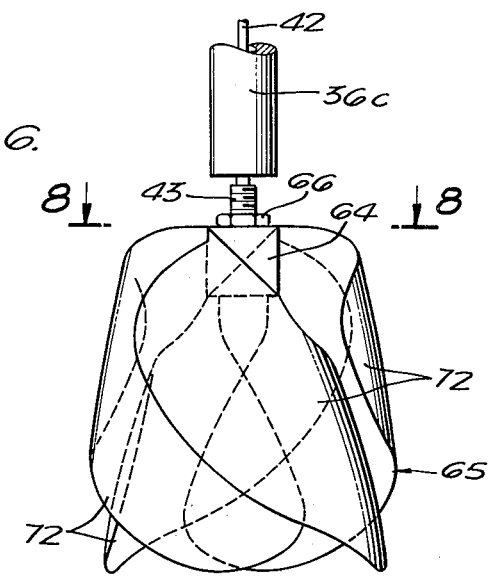
FIG. 7 is an enlarged side elevational view of the collapsed or contracted impeller as shown in FIG. 6.
Figure 8:
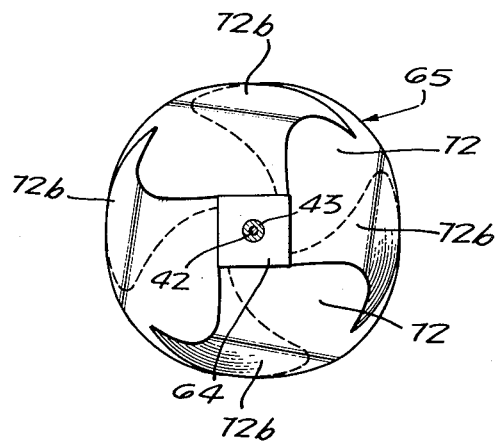
FIG. 8 is a horizontal sectional view as taken on the line 8—8 of FIG. 7.

Referring to FIGS. 6, 7, and 8, it is seen that as flow metering device 16 is introduced into tubing 14 for passage therethrough to the well proper, flexible guide members 82 are caused to be deformed or flexed so as to engage blades 72 of impeller 65. During contraction of the blades 72, it will be noted, with particular reference to FIGS. 7 and 8, that the blades wrap or are caused to extend circumferentially about one another, much in the manner of flower petals. Upon continued insertion of device 16 into tubing 14, impeller 65 is flexed, contracted or decreased in overall lateral size by virtue of the resilient or flexible characteristics of such blades. As the overall lateral dimension or size of impeller 65 is reduced, the several blades 72 are caused to increase their overlapping relationship with adjacent blades as shown at 72b in FIG.

8 until the impeller is sufficiently contracted or reduced in size to traverse tubing 14.

After device 16 has been passed through the entire length of tubing 14, centralizing springs 82 resiliently expand to make contact with the passage wall or well casing for centering of the flow metering device therewithin. In like manner, after device 16 is beyond tubing 14, all of the vanes or blades 72 of impeller 65 resiliently or flexibly return to their free position to provide an impeller which substantially completely fills the cross-sectional dimension of such passage. It will be understood that the extent to which the expanded impeller 65 fills or spans the passage through the casing depends upon the inside diameter of the casing. In any event, the device 16 may be employed with beneficial results in different sizes of casing, limited in respect to the smaller casings by the need for the impeller 65 to turn freely within centralizer springs 82. Moreover, the device 16 may be made in a range of sizes such that smaller impellers 65 may be employed in small diameter casing, while larger impellers may be employed in larger diameter casings, thus taking maximum advantage of an impeller which fills or spans a substantial area of the cross section of the casing.

Upon retraction of the flow metering device from within the well proper, it is again introduced into tubing 14, whereupon the resilient guide members 82 and the resilient blades 72 of impeller 65 again deform or contract so as to permit device 16 to be removed from the well.

The operation of flow metering device 16 while within the passage or well proper is as follows:

Any vertical or axial movement of fluid at impeller 65 engages the blades 72 thereof and due to the configuration and disposition of the latter with respect to the axis of rotation of impeller 65, creates a torque on the latter effecting rotation thereof at a rate corresponding to the flow rate of such fluid. Rotation of impeller 65 effects corresponding rotation of shaft 42 and contact member 48 attached thereto. For each and every rotation of contact member 48, the electrical circuit including the equipment within housing 26 on the surface of the ground is both completed and interrupted. This circuit comprises lead wire 24, the brush and slip ring of drum 22, lead conductor 18a and contact 18c of cable 18, conducting members 60 and 58, resilient contact members 50, rotatable contact 48, shaft 42, bronze bushing 70 and bearing housing 36. The return circuit may be to ground through cable coupling member 30 and the outer sheath of cable 18.

By utilizing suitable equipment within housing 26, as for instance a frequency counter or frequency meter, each of which is well known by persons skilled in the art to which this invention appertains, the number of completions and/or interruptions of such electrical circuit per unit time can be readily determined as a measurement of the speed of rotation of contact member 48 and hence impeller 65. It is then possible to properly calibrate the speed of rotation of impeller 65 in terms of the rate of fluid flow acting thereon so as to afford indication at the surface of the ground of fluid flow rates within the passage. Also, a change in the speed of rotation of impeller 65 affords indication of a corresponding relative change in fluid flow within such passage.

By noting the position or depth of flow metering device 16 within the bore hole as by using apparatus which indicates the length of cable 18 used in suspending device 16 therewithin, it is seen that a log or record can be compiled showing the rate of fluid flow throughout the entire length or depth of the well. Such information can afford indication of points or places of ingress and egress of fluid within the well since any marked change in fluid flow rate between several spaced positions indicates that fluid is either entering or leaving the bore hole between such positions.

It is thus seen that the present invention provides a flow metering device and apparatus including the same, for affording accurate measurements of fluid flow within a passage, access to which is limited or restricted by means partially restricting the open end thereof. It is also seen that this invention is particularly applicable and desirable for use in the flow metering of wells as it clearly eliminates the necessity for the costly and time-consuming work of removing the tubing from within the well.

Although I have shown and described certain specific embodiments of my invention, I am fully aware that many modifications thereof are possible. My invention, therefore, is not to be restricted except insofar as is necessitated by the prior art and by the spirit of the appended claims.

What I claim is:

1. In a fluid flow measuring device for use in a passage to which access is limited by means having a reduced opening, a fluid flow responsive impeller formed of resilient material to permit said impeller to be partially contracted for traversing said reduced opening and to be expanded within said passage to fill substantially the entire transverse dimension thereof, said impeller including a hub and a plurality of blades supported on said hub at angularly spaced locations, said blades when expanded extending longitudinally relative to said hub and angularly relative to one another with adjacent edges of the respective blades overlapped in axially spaced relation and defining an angularly extended flow path between said edges.

2. In a fluid flow measuring device for use in a passage to which access is limited by means having a reduced opening, comprising a housing capable of being passed through said reduced opening, a rotatable shaft extending from said housing, fluid flow responsive impeller means on said shaft and contractible for passage through said reduced opening and expansible within said passage to fill substantially the entire transverse dimension thereof, and means in said housing for determining rotation of said shaft.

3. In a fluid flow measuring device for use in a passage to which access is limited by means having a reduced opening, comprising a housing capable of being passed through said reduced opening, a rotatable shaft extending from said housing, a fluid flow responsive impeller on said shaft and including blades formed of resilient material to permit said impeller to be partially contracted for traversing said reduced opening and to be expanded within said passage to fill substantially the entire transverse dimension thereof, and means in said housing for determining rotation of said shaft.

4. In a fluid flow measuring device for use in a well bore to which access is limited by tubing having a through opening which is smaller than said bore, a fluid flow responsive impeller substantially filling the entire transverse dimension of said bore and comprising a plurality of radially extending contractible blades having adjacent overlapped portions axially displaced to permit said blades to be contracted for movement of said impeller through said tubing, said adjacent blade portions also being spaced from one another and extending helically to provide a flow passage for fluid therebetween.

5. In a fluid flow measuring device for use in a well bore to which access is limited by tubing having a through opening of reduced size, a fluid flow responsive impeller substantially filling the entire transverse dimension of said bore and comprising a plurality of radially extending flexible blades so disposed that adjacent portions of adjacent blades are axially displaced, and contractible well bore engaging guide means spanning said blades and engageable therewith upon forcible entry of said guide means into said tubing to flexibly and increasingly overlap adjacent blades for reduction in the size of said impeller for passage through said tubing.

6. In a fluid flow measuring device for use in a passage to which access is limited by means having a reduced through opening, the combination of, an impeller comprising blades formed of resilient material to permit said impeller to be partially contracted when traversing said reduced opening and to be expanded within said passage to fill substantially the entire transverse dimension thereof, and at least three guide members spanning said impeller to engage the wall of said passage so as to position said impeller centrally thereof and engageable with said impeller blades to contract the latter, said guide members being formed of flexible material to permit flexing thereof for passage through said reduced opening.

7. Apparatus for measuring fluid flow in a passage to which access is limited by means formed with a through opening which is smaller than said passage, said apparatus comprising, a housing capable of being passed through said smaller opening, a rotatable shaft extending from said housing longitudinally of said passage, an impeller on said shaft filling substantially the entire transverse dimension of said passage to effect rotation of said shaft in accordance with fluid flow in said passage, and means for determining the rate of rotation of said shaft as a measure of fluid flow in said passage, said impeller comprising at least one blade formed of flexible material to permit said impeller to be flexibly reduced in size to pass through said smaller opening.

8. Apparatus for measuring fluid flow in a passage to which access is limited by means formed with a through opening which is smaller than said passage, said apparatus comprising, a housing capable of being passed through said smaller opening, a rotatable shaft extending from said housing longitudinally of said passage, an impeller on said shaft filling substantially the entire transverse dimension of said passage to effect rotation of said shaft in accordance with fluid flow in said passage, and means for determining the rate of rotation of said shaft as a measure of fluid flow in said passage, said impeller comprising a plurality of blades formed of flexible material to permit said impeller to be flexibly reduced in size to pass through said smaller opening.

9. Apparatus for measuring fluid flow in a passage to which access is limited by means formed with a through opening which is smaller than said passage, said apparatus comprising, a housing capable of being passed through said smaller opening, a rotatable shaft extending from said housing longitudinally of said passage, an impeller on said shaft filling substantially the entire transverse dimension of said passage to effect rotation of said shaft in accordance with the flow of substantially all of the fluid at a given transverse section of said passage, and means within said housing for determining the rate of rotation of said shaft as a measure of fluid flow at said transverse section, said impeller comprising a plurality of radially extending flexible blades so disposed on said shaft that adjacent portions of adjacent blades are axially offset whereby said blades can be flexed into overlapping relation to thereby reduce the size of said impeller and permit the same to pass through said smaller opening.

10. Apparatus for measuring fluid flow in a passage to which access is limited by means formed with a through opening which is smaller than said passage, said apparatus comprising, a housing capable of being passed through said smaller opening, a rotatable shaft extending from said housing longitudinally of said passage, an impeller on said shaft filling substantially the entire transverse dimension of said passage to effect rotation of said shaft in accordance with fluid flow in said passage, means within said housing for determining the rate of rotation of said shaft as a measure of fluid flow in said passage, said impeller comprising at least one blade formed of flexible material to permit said impeller to be flexibly reduced in size to pass through said smaller opening, and guide means fixed to said housing for engaging the wall of said passage to center said impeller therewithin and formed of flexible material to permit said guide means to be flexibly deformed so as to pass through said smaller opening.

11. Apparatus for measuring fluid flow in a passage to which access is limited by means formed with a through opening which is smaller than said passage, said apparatus comprising, a housing capable of being passed through said smaller opening, a rotatable shaft extending from said housing longitudinally of said passage, an impeller on said shaft filling substantially the entire transverse dimension of said passage to effect rotation of said shaft in accordance with fluid flow in said passage, means within said housing for determining the rate of rotation of said shaft as a measure of fluid flow in said passage, said impeller comprising at least one blade formed of flexible material to permit said impeller to be flexibly reduced in size to pass through said smaller opening, and guide means fixed to said housing and extending around said impeller for engaging the wall of said passage to center said impeller therewithin, said guide means being formed of flexible material to permit the same to be flexibly deformed so as to pass through said smaller opening.

12. Apparatus for measuring fluid flow in a passage to which access is limited by means formed with a through opening which is smaller than said passage, said apparatus comprising, a housing capable of being passed through said smaller opening, a rotatable shaft extending from said housing longitudinally of said passage, an impeller on said shaft filling substantially the entire transverse dimension of said passage to effect rotation of said shaft in accordance with fluid flow in said passage, means within said housing for determining the rate of rotation of said shaft as a measure of fluid flow in said passage, said impeller comprising at least one blade formed of resilient material to permit said impeller to be flexibly reduced in size to pass through said smaller opening, and guide members fixed to said housing and extending axially of and about said impeller for engaging the wall of said passage to center said impeller therewithin, said guide members being formed of flexible material to permit the same to be flexibly deformed upon forcible entry into said smaller opening so as to pass therethrough.

13. Apparatus for measuring fluid flow in a passage to which access is limited by means formed with a through opening which is smaller than said passage, said apparatus comprising, a housing capable of being passed through said smaller opening, a rotatable shaft extending from said housing longitudinally of said passage, an impeller on said shaft filling substantially the entire transverse dimension of said passage to effect rotation of said shaft in accordance with the flow of substantially all of the fluid at a given transverse section of said passage, means within said housing for determining the rate of rotation of said shaft as a measure of fluid flow at said transverse section, said impeller comprising a plurality of radially extending flexible blades so disposed on said shaft that adjacent portions of adjacent blades are axially offset whereby said blades can be flexed into overlapping relation to thereby reduce the size of said impeller and permit the same to pass through said smaller opening, and guide means fixed to said housing for engaging the wall of said passage to center said impeller therewithin and formed of flexible material to permit said guide means to be flexibly deformed so as to pass through said smaller opening.

References Cited in the file of this patent

UNITED STATES PATENTS

| | | |
|---|---|---|
| 332,910 | Klein | Dec. 22, 1885 |
| 576,425 | Bilton et al. | Feb. 2, 1897 |
| 1,662,429 | Lowy | Mar. 13, 1928 |
| 1,852,414 | Hoff | Apr. 5, 1932 |
| 2,245,759 | Chrisman | June 17, 1941 |
| 2,334,920 | Gosline et al. | Nov. 23, 1943 |
| 2,770,131 | Sparling | Nov. 13, 1956 |